Jan. 1, 1935.    A. C. GOINS    1,986,724
STRIP LOOP CONTROL
Filed Feb. 18, 1933
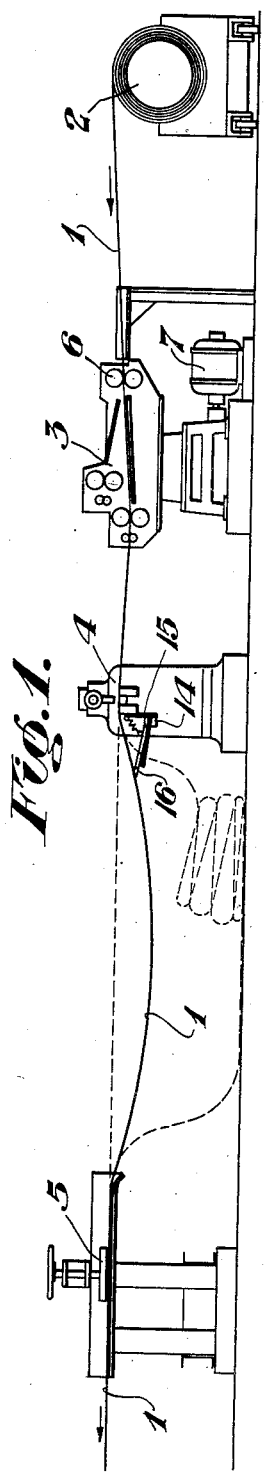
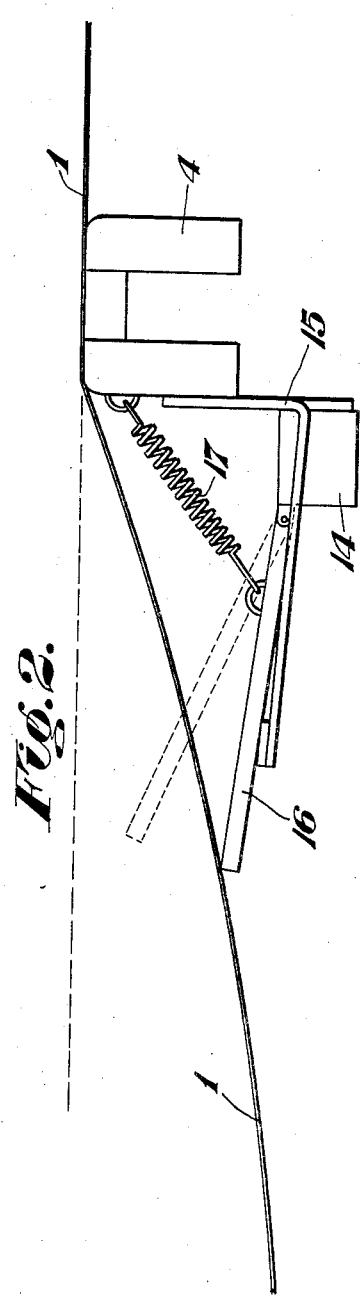
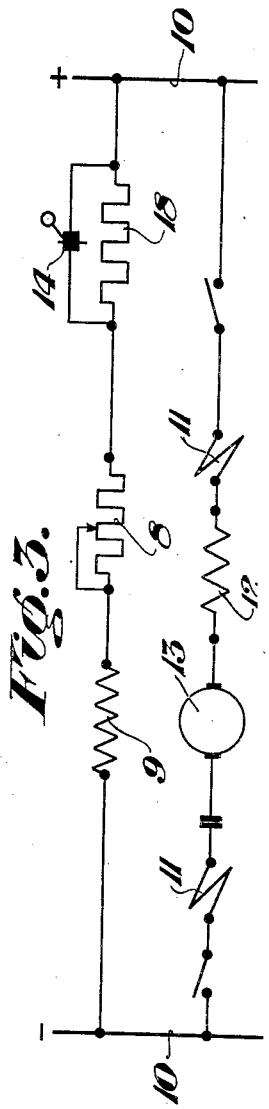
Inventor:
ALFRED C. GOINS,
by: Usina & Rauber
his Attorneys.

Patented Jan. 1, 1935

1,986,724

UNITED STATES PATENT OFFICE 1,986,724

STRIP LOOP CONTROL

Alfred C. Goins, Gary, Ind., assignor to American Sheet and Tin Plate Company, a corporation of New Jersey Application February 18, 1933, Serial No. 657,453

1 Claim. (Cl. 271—2.3)

This invention relates to the general handling of continuously moving wide metal strip, one of the objects being to maintain a catenary loop in the same so that minor speed variations in its various feeding devices will not cause damage. It is particularly intended for application during the manufacture of such strip and may be incorporated with the various mechanisms then used. Other objects may be inferred from the following illustrative example of a specific form of the invention.

Referring to the drawing:

Figure 1 is a side elevation of a number of machines through which wide metal strip is feeding.

Figure 2 is an enlarged detail from Figure 1.

Figure 3 is a wiring diagram.

The wide metal strip 1 is carried by a reel 2 and feeds through a side slitter 3, a welding machine 4, a receiving guide 5 and onto other manufacturing or processing apparatus. Although not shown, it may be assumed that the strip is pulled by pinch-rolls or the like at a uniform speed somewhere beyond the receiving guide 5.

The strip is drawn from the reel 2 by pinch-rolls 6 forming a part of the side slitter 3 and driven by a motor 7. This motor 7 is presumably controlled by the usual variable rheostat so that its feeding speed may be adjusted in an attempt to match that of the strip as it is received by the guide 5. This is a practical impossibility, however, and there is danger of the strip becoming damaged. For instance, if the pinch-rolls 6 operate too slowly the strip receives tension and possibly ruptures. On the other hand, if they operate too speedily there is an excess of the strip formed between the welding machine 4 and the receiving guide 5, which piles up on the floor, kinks and is generally damaged. These undesirable conditions are indicated by dotted lines in the drawing.

According to the present invention the unsupported length of continuously moving strip between the welding machine 4 and the receiving guide 5 is maintained in a catenary loop. This provides a slight excess of material and gives sufficient leeway so that slightly unequal feeding and receiving speed variations cause no damage.

The maintenance of such a catenary loop is accomplished in the following manner:

The usual variable resistance 8 is connected in series with the shunt field 9 of the motor 7. The wiring diagram illustrates this as being an ordinary direct current motor powered by the lines 10 and shows the usual overload switches 11, series field 12 and armature 13.

A limit switch 14 of the type ordinarily used in steel mills is fixed to the welding machine 4 by a bracket 15. The operating lever of this switch is prolonged to form a finger member 16 which is urged into contact with the under side of the strip 1 by a spring 17. The location of this switch is a matter of convenience only, as the prolonged operating lever 16 might also be operated by gravitationally contacting the upper side of the strip 1.

The wiring diagram also shows a fixed resistance 18 arranged in series with the variable resistance 8. This resistance is probably best proportioned to have a value somewhat less than that of the individual steps provided by the variable resistance. The diagram further shows that this fixed resistance 18 is shunted out of circuit with the variable resistance 8 by operation of the limit switch 14.

The operation of the just described apparatus is substantially as follows:

Let it be assumed that the strip has been fed through the various apparatus shown and is being received at a steady speed through the guide 5 under the influence of the pulling mechanism which is not shown. A workman adjusts the variable resistance 8 so that the motor 7 drives the pinch-rolls 6 at a slightly faster speed than the strip has where it passes through the receiving guide 5. This immediately starts the formation of a sagging loop between the welding machine 4 and the receiving guide 5. As this loop continues to sag it begins to depress the member 16 which operates the limit switch 14. This switch soon closes and shunts out the effect of the resistance 18 so that the current through the shunt coil 9 is increased.

The speed of the motor then decreases and, assuming that the resistance 18 has been properly proportioned, the pinch-rolls 6 feed the strip at a slower speed than that with which it is taken up at the guide 5. The sagging unsupported length of strip between the welding machine 4 and the guide 5 immediately begins to rise and the limit switch 14 soon opens so the resistance 18 is replaced in circuit with the shunt field 9 of the motor 7.

From the above it will be seen that the catenary loop is maintained by the continual and automatic insertion and removal of a resistance of small value in series connection with the regular resistance of the motor. The fact that the loop hunts between the limits determined by the switch setting is not objectionable as it is not necessary to maintain any one exact form.

Although the limit switch 14 is illustrated as the conventional single contact type it is obviously possible to construct one which closes a series of contacts, depending upon the position of the member 16, and inserts or removes a corresponding series of resistances in the motor circuit. The simplicity of the form shown, however, indicates that it will probably be preferable in the majority of cases.

Although I have shown one specific embodiment of my invention in accordance with the patent statutes it will be understood that I do not wish to be limited thereto, since various modifications may be made without departing from the scope of my invention, as defined in the following claim.

I claim:

A machine for handling moving metal strip, including the combination of means for supporting said strip at spaced points, pinch-rolls engaging said strip at one of said points, a motor turning said pinch-rolls and means for varying the speed of said motor so as to maintain said strip in the form of a catenary loop between said points, the last named means including a controlling element constructed and arranged to contact said strip between said points without material change in its catenary loop form.

ALFRED C. GOINS.